(12) United States Patent
Carter et al.

(10) Patent No.: US 10,466,915 B2
(45) Date of Patent: Nov. 5, 2019

(54) ACCESSING ENCODED BLOCKS OF DATA IN MEMORY

(71) Applicant: ARM Limited, Cambridge (GB)

(72) Inventors: Quinn Carter, Ontario (CA); Lars Oskar Flordal, Uppsala (SE); Jakob Axel Fries, Malmo (SE)

(73) Assignee: Arm Limited, Cambridge (GB)

( * ) Notice: Subject to any disclaimer, the term of this patent is extended or adjusted under 35 U.S.C. 154(b) by 75 days.

(21) Appl. No.: 15/636,524

(22) Filed: Jun. 28, 2017

(65) Prior Publication Data

US 2018/0004443 A1 Jan. 4, 2018

(30) Foreign Application Priority Data

Jun. 29, 2016 (GB) .................................. 1611296.3

(51) Int. Cl.
*G06F 3/06* (2006.01)
*H04N 19/423* (2014.01)

(52) U.S. Cl.
CPC ............ *G06F 3/0619* (2013.01); *G06F 3/065* (2013.01); *G06F 3/068* (2013.01); *H04N 19/423* (2014.11)

(58) Field of Classification Search
CPC ...... G06F 3/0608; G06F 3/0619; G06F 3/064; G06F 3/065; G06F 3/0661; G06F 3/068; G06F 3/0683; G06F 3/0685; G06F 2212/40; G06F 2212/401; H04N 19/423
USPC ........................... 345/547, 555; 711/162, 170
See application file for complete search history.

(56) References Cited

U.S. PATENT DOCUMENTS

| | | | |
|---|---|---|---|
| 5,900,865 A | 5/1999 | Howe | |
| 6,088,047 A | 7/2000 | Bose | |
| 6,529,201 B1 | 3/2003 | Ault | |
| 6,614,442 B1 | 9/2003 | Ouyang | |
| 7,230,630 B2 * | 6/2007 | Seong | G06T 9/001 345/549 |
| 8,638,337 B2 * | 1/2014 | Tung | G06T 11/40 345/555 |
| 2002/0109693 A1 | 8/2002 | Champion | |
| 2004/0155883 A1 | 8/2004 | Ju | |
| 2004/0179741 A1 * | 9/2004 | Ozawa | H04N 19/176 382/232 |

(Continued)

FOREIGN PATENT DOCUMENTS

AU 2006252122 7/2008

OTHER PUBLICATIONS

Bethel, "Library API for Z-Order Memory Layout", https://www.osti.gov/biblio/1232087, 1 page, Feb. 1, 2015. (Year: 2015).*

(Continued)

*Primary Examiner* — Gary J Portka
(74) *Attorney, Agent, or Firm* — Vierra Magen Marcus LLP

(57) ABSTRACT

A method of storing encoded blocks of data in memory comprises generating headers for the encoded blocks of data. The headers are stored in memory according to a tiled layout based on tiles of plural adjacent blocks of data elements of the array of data elements. Respective sets of the encoded blocks of data are also stored in respective distinct regions of memory locations that have been allocated to those sets. The method provides an efficient way to access headers and corresponding encoded blocks of data in memory.

15 Claims, 8 Drawing Sheets

(56) References Cited

U.S. PATENT DOCUMENTS

2013/0034309 A1    2/2013  Nystad
2013/0195352 A1    8/2013  Nystad
2015/0379684 A1*  12/2015  Ramani ................... G06T 1/60
                                                                345/531

OTHER PUBLICATIONS

GB Combined Search and Examination Report dated Dec. 2, 2016, GB Patent Application No. GB1611296.3.
GB Search Report dated Jan. 11, 2017, GB Patent Application No. GB1611296.3.
Ozturk, et al., "Using data compression for increasing memory system utilization," IEEE Transactions on Computer-Aided Design of Integrated Circuits and Systems, Jun. 2009, pp. 901-914.
Diktas et al., "Parallel ID Shadow-Map Decompression on GPU," Proceedings of the Ninth International Symposium on Parallel and Distributed Computing (ISPDC), 2010, pp. 79-84.

* cited by examiner

Figure 5:
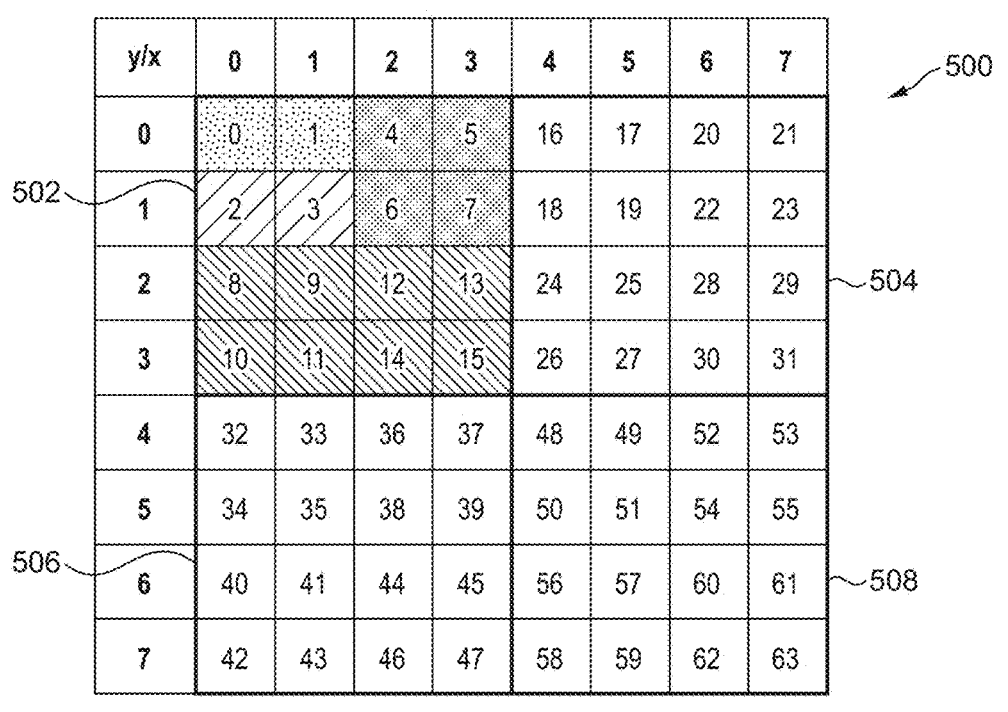

| y/x | 0 | 1 | 2 | 3 | 4 | 5 | 6 | 7 |
|---|---|---|---|---|---|---|---|---|
| 0 | 0 | 1 | 4 | 5 | 16 | 17 | 20 | 21 |
| 1 | 2 | 3 | 6 | 7 | 18 | 19 | 22 | 23 |
| 2 | 8 | 9 | 12 | 13 | 24 | 25 | 28 | 29 |
| 3 | 10 | 11 | 14 | 15 | 26 | 27 | 30 | 31 |
| 4 | 32 | 33 | 36 | 37 | 48 | 49 | 52 | 53 |
| 5 | 34 | 35 | 38 | 39 | 50 | 51 | 54 | 55 |
| 6 | 40 | 41 | 44 | 45 | 56 | 57 | 60 | 61 |
| 7 | 42 | 43 | 46 | 47 | 58 | 59 | 62 | 63 |

ACCESSING ENCODED BLOCKS OF DATA IN MEMORY

BACKGROUND

The technology described herein relates to a method of and apparatus for storing an encoded block of data in memory. It also relates to the corresponding method of and apparatus for retrieving data for an encoded block of data from memory.

It is common to encode arrays of data elements, such as arrays of graphics data values (e.g. frames for display or graphics textures), so as to compress the data in order to reduce bandwidth and memory consumption. This is particularly desirable in data processing apparatus, e.g. of portable devices, where processing resources and processing power may be limited.

Arrays of data elements are often divided into smaller blocks of data elements and then encoded or decoded on a block by block basis. This can allow partial updating of, or random access to, data elements of the encoded array without needing to encode or decode the entire array each time a data element needs to be updated or accessed. This is particularly the case, for example, in graphics processing apparatus where partial updating of a frame or random access into a texture may be desired.

In some arrangements, the blocks of data elements for an array of data elements may compress by differing degrees, and thus the encoded versions of those blocks of data elements may be different data sizes to one another. For example, blocks of substantially uniform data values (e.g. substantially uniform appearance or colour) tend to compress well, whereas blocks of highly varied data values tend not to compress so well. Thus, the size of the encoded versions of the blocks of data elements may not be known in advance of the encoding scheme being applied to the original unencoded blocks of data elements.

Also, in some arrangements the encoded blocks of data for an array of data elements may be stored arbitrarily at substantially any location in memory. This can allow the encoded blocks to be stored in memory in a flexible way, e.g. by reusing memory that is no longer needed and/or by not leaving substantial areas of unused memory.

However, the above arrangements generally mean that the encoded blocks of data are not at predictable locations in memory.

In the above arrangements, headers may be provided for the encoded blocks of data, with the headers being stored at predictable locations in memory and indicating the locations of the encoded blocks of data. These headers are typically stored contiguously in memory based on a scan-line or raster order that traverses the corresponding blocks of the array. In these arrangements, when a particular encoded block is required for decoding, the location of the header for that encoded block can readily be determined from the scan-line and distance along the scan-line of the corresponding block in the array. The header can then be read so as to determine the location of its encoded block. The encoded block of data can then be read from memory for decoding.

The Applicants believe that there remains scope for improved arrangements for storing encoded blocks of data in memory.

BRIEF DESCRIPTION OF THE DRAWINGS

Various embodiments of the technology described herein will now be described by way of example only and with reference to the accompanying drawings, in which:

FIG. 5 shows an order for storing headers according to a tiled layout in accordance with an embodiment of the technology described herein;

Figure 1:
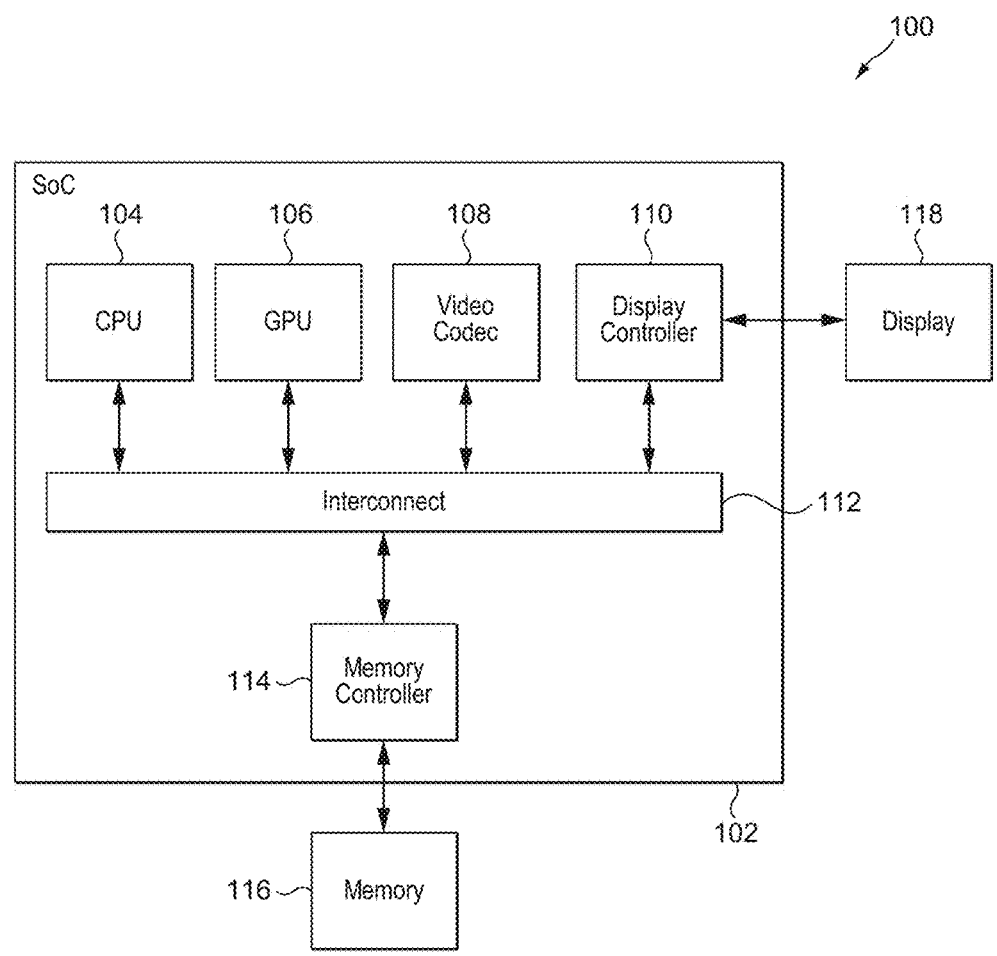
FIG. 1 shows schematically a data processing system according to an embodiment of the technology described herein.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

DETAILED DESCRIPTION

An embodiment of the technology described herein comprises a method of storing an encoded block of data in memory, the method comprising:

encoding a block of data elements of an array of data elements to generate an encoded block of data that represents the block of data elements;

generating a header for the encoded block of data, wherein the header indicates a location in memory for storing the encoded block of data;

writing out the header for the encoded block of data to memory, wherein the header for the encoded block of data is stored in memory according to a tiled layout, the tiled layout being formed of tiles of plural adjacent blocks of data elements of the array of data elements; and writing out the encoded block of data to memory, wherein the encoded block of data is stored in memory at the location indicated in the header for the encoded block of data.

Another embodiment of the technology described herein comprises a data processing apparatus for storing an encoded block of data in memory, the apparatus comprising:
encoding circuitry configured to:
encode a block of data elements of an array of data elements to generate an encoded block of data that represents the block of data elements; and
generate a header for the encoded block of data, wherein the header indicates a location in memory for storing the encoded block of data; and write control circuitry configured to:
write out the header for the encoded block of data to memory, wherein the header for the encoded block of data is stored in memory according to a tiled layout, the tiled layout being formed of tiles of plural adjacent blocks of data elements of the array of data elements; and
write out the encoded block of data to memory, wherein the encoded block of data is stored in memory at the location indicated in the header for the encoded block of data.

Thus, in embodiments of the technology described herein, a header is generated for an encoded block of data that indicates the location in memory for storing that encoded block of data. As discussed above, this type of arrangement can accommodate encoded blocks of data being of different data sizes to one another and/or allow encoded blocks of data to be stored in memory in a flexible way. Furthermore, in embodiments of the technology described herein, the header for the encoded block of data is stored in memory according to a tiled layout that is based on tiles of plural adjacent blocks of data elements of the array of data elements, rather than, e.g. based on a strict scan-line or raster order that traverses the blocks of the array. The Applicants have identified that this use of a tiled layout for storing headers can provide a particularly efficient way to access the desired headers in memory.

For example, in conventional arrangements in which headers are stored in strict scan-line or raster order, relatively more widely distributed headers, e.g. from relatively more pages of header data, may need to be read in order to locate the encoded data for blocks that will be adjacent when an array is rotated, e.g. for display. On the contrary, in embodiments of the technology described herein, using a tiled layout for storing the headers can mean that relatively more closely distributed headers, e.g. from relatively fewer pages of header data, need to be read in order to locate the encoded data for blocks that will be adjacent when an array is rotated.

Embodiments of the technology described herein can therefore reduce the number of memory accesses needed to read the header data for locating the desired encoded blocks. This in turn can significantly reduce memory bandwidth and power consumption and/or improve the performance of the data processing apparatus.

Notwithstanding these benefits in relation to rotated arrays of data elements, the Applicants have identified that embodiments of the technology described herein can still work in an acceptably efficient manner even when the array of data elements is not rotated. Thus, the technology described herein is not limited merely to arrays that are to be rotated, e.g. for display.

Indeed, for another example, storing the headers according to a tiled layout can be particularly efficient where the array of data elements is later to be decoded and used for further processing by processing circuitry (e.g. a graphics processor) that generally processes arrays of data elements in blocks rather than lines. Again, using a tiled layout for storing the headers can mean that relatively more closely distributed headers, e.g. from relatively fewer pages of header data, need to be read in order to locate the encoded blocks that need to be processed.

Again, the use of a tiled layout for storing the headers can reduce the number of memory accesses needed to read the header data for locating the desired blocks, and this in turn can significantly reduce memory bandwidth and power consumption and/or improve the performance of the data processing apparatus.

Again, notwithstanding the benefits in relation to processing circuitry (e.g. graphics processors) that generally process arrays of data elements in blocks, embodiments of the technology described herein can still work in an acceptably efficient manner even when the array of data elements is later to be processed by processing circuitry (e.g. an output (e.g. display) processor) that generally processes arrays of data elements in lines rather than blocks. Thus, the technology described herein is not limited merely to processing circuitry (e.g. graphics processors) that generally process arrays of data elements in blocks.

The (original unencoded) array of data elements may take any desired and suitable form. For example, the array of data elements may correspond to an array of (e.g. graphics) data positions (e.g. sampling positions). The array of data elements or positions may correspond to all or part of a desired (e.g. graphics) output, such as a frame or texture. There may be any desired and suitable correspondence between the data elements or positions and the desired output. Thus, the data elements or positions of the array may each correspond to a pixel or pixels of a frame or to a texel or texels of a texture.

The array of data elements can be any desired and suitable size or shape in terms of data elements or positions, but is in an embodiment rectangular (including square or oblong). For example, the array of data elements may be at least 128×128 data elements or positions in size, but may be much larger than this.

The array of data elements may be divided into plural blocks for encoding purposes. The block of data elements of the array of data elements may be one such block. Thus, encoding the block of data elements of the array of data elements may comprises dividing the array of data elements into plural blocks of data elements for encoding. The block of data elements of the array of data elements may then be encoded to generate the encoded block of data.

The blocks of data elements of the array of data elements may be non-overlapping and/or may be similar or identical in size or shape. The array of data elements can be any desired and suitable size or shape in terms of such blocks, but is again in an embodiment rectangular (including square or oblong). For example, the array of data elements may be at least 64 (e.g. 8×8 or 4×16) blocks in size, but may be much larger than this.

The block of data elements of the array of data elements can also be any desired and suitable size or shape in terms of data elements or positions, but is again in an embodiment rectangular (including square or oblong).

In embodiments, the block of data elements of the array of data elements may be square (e.g. 16×16 data elements or positions in size). These embodiments may be particularly efficient, for example, when the array of data elements may be rotated (e.g. for display) and/or may be used for further processing by processing circuitry (e.g. a graphics processor) that generally processes arrays of data elements in blocks rather than lines.

Alternatively, the block of data elements of the array of data elements may be oblong (e.g. 32×8 data elements or positions in size). These embodiments may be more efficient, for example, when the array of data elements may not be rotated and/or may be processed by processing circuitry (e.g. an output (e.g. display) processor) that generally processes arrays of data elements in lines rather than blocks, whilst still being efficient if the array of data elements happens to be rotated and/or processed by processing circuitry (e.g. a graphics processor) that generally processes arrays of data elements in blocks rather than lines.

The block of data elements of the array of data elements may also be divided into plural subblocks of data elements for encoding purposes. Thus, encoding the block of data elements of the array of data elements may comprise dividing the block of data elements of the array of data elements into plural subblocks of data elements for encoding. The block of data elements of the array of data elements may then be encoded to generate the encoded block of data on a subblock by subblock basis.

Again, the plural subblocks of data elements may be non-overlapping and/or may be similar or identical in size or shape. The blocks can be any desired and suitable size or shape in terms of such subblocks, but are again in an embodiment rectangular (including square or oblong).

As discussed above, in embodiments, the block of data elements may be square (e.g. 4×4 subblocks in size). These embodiments may be particularly efficient, for example, when the array of data elements may be rotated (e.g. for display) and/or may be used for further processing by processing circuitry (e.g. a graphics processor) that generally processes arrays of data elements in blocks rather than lines.

Alternatively, as discussed above, the block of data elements may be oblong (e.g. 8×2 subblocks in size). These embodiments may be more efficient, for example, when the array of data elements may not be rotated and/or may be processed by processing circuitry (e.g. an output (e.g. display) processor) that generally processes arrays of data elements in lines rather than blocks, whilst still being efficient if the array of data elements happens to be rotated and/or processed by processing circuitry (e.g. a graphics processor) that generally processes arrays of data elements in blocks rather than lines.

The particular shape of the blocks of data elements may be selected (e.g. in use) based on the intended use of the array of data elements. For example, a first shape may be selected for a first intended use of the array of data elements, and a second shape may be selected for a second intended use of the array of data elements. The first shape may be square (e.g. 16×16 data elements or 4×4 subblocks in size). The second shape may be oblong (e.g. 32×8 data elements or 8×2 subblocks in size). In the first intended use, the array of data elements may be rotated (e.g. for display) and/or used for further processing by processing circuitry (e.g. a graphics processor) that generally processes arrays of data elements in blocks rather than lines. In the second intended use, the array of data elements may not be rotated and/or may be processed by processing circuitry (e.g. an output (e.g. display) processor) that generally processes arrays of data elements in lines rather than blocks.

The subblocks of data elements of the array of data elements can also be any desired and suitable size or shape in terms of data elements or positions, but are again in an embodiment rectangular (including square or oblong). For example, the subblocks may be 4×4 data elements or positions in size.

The (original unencoded) data elements of the array of data elements may have any desired and suitable format. For example, the format may represent a single (e.g. graphics) data value (e.g. R, G, B, Y, U, V, α, etc.). Alternatively, the format may represent plural (e.g. graphics) data values (e.g. RGB, RGBα, YUV, YUVα, etc.). The format may, for example, comprise 8 bits per data value. The format may, for example, comprise 32 bits per data element. The format may be, for example, RGBX8.

As will be appreciated, the unencoded data size of a block or subblock is dependent both on the block or subblock size in terms of data elements and the particular format used for the data elements of the block or subblock. The unencoded data size may be defined in any desired and suitable way, such as by a number of bits or bytes. For example, for a block that is 256 (e.g. 16×16 or 32×8) data elements in size and that has 32 bits per data element, the unencoded data size of the block would be 1024 bytes (i.e. [256×32]/8). For another example, for a subblock that is 16 (e.g. 4×4) data elements in size and that has 32 bits per data element, the unencoded data size of the subblock would be 64 bytes (i.e. [16×32]/8).

As discussed above, the block of data elements of the array of data elements is encoded to generate the encoded block of data. The encoding scheme used to encode the block of data elements of the array of data elements can take any desired and suitable form.

The encoding scheme used to encode the block of data elements of the array of data elements may, for example, comprise compression of the data elements of the block. The encoding scheme used to encode the block of data elements of the array of data elements may also or instead comprise encryption of the data elements of the block.

In embodiments, the encoding scheme used to encode the block of data elements of the array of data elements may be substantially lossless (e.g. the precision of the data elements of the block of the array of data elements can substantially be recovered when decoding the encoded block of data). Alternatively, the encoding scheme used to encode the block of the array of data elements may be lossy (e.g. the precision of the data elements of the block of the array of data elements cannot be recovered when decoding the encoded block of data).

In embodiments, the encoding scheme used to encode the block of the array of data elements may provide encoded blocks of data of non-fixed data size. For the purposes of the present disclosure, an encoding scheme that provides encoded blocks of data of non-fixed data size is in an embodiment an encoding scheme for which, for plural unencoded blocks having the same array size (e.g. in terms of number of data elements) but having different data content (e.g. in terms of data values for the data elements), the data size of the encoded versions of those blocks (e.g. in terms of bits or bytes) that are provided when using that encoding scheme is not the same.

Alternatively, the encoding scheme used to encode the block of the array of data elements may provide encoded blocks of data of fixed data size. For the purposes of the present disclosure, an encoding scheme that provides encoded blocks of data of fixed data size is in an embodiment an encoding scheme for which, for plural unencoded blocks having the same array size (e.g. in terms of number of data elements) but having different data content (e.g. in terms of data values for the data elements), the data size of the encoded versions of those blocks (e.g. in terms of bits or bytes) that are provided when using that encoding scheme is the same.

In embodiments, the encoding scheme used to encode the block of data elements of the array of data elements may comprise an entropy encoding scheme or difference encoding scheme.

In these embodiments, encoding the block of data elements of the array of data elements may comprise determining a (e.g. the lowest) data value for the block of data elements. Encoding the block of data elements of the array of data elements may further comprise determining differences between the (e.g. the lowest) data value for the block of data elements and corresponding data values for each of the data elements and/or subblocks of the block of data elements.

The encoded block of data may therefore comprise a (e.g. lowest) data value for the block of data elements and a set of differences between the data value and corresponding data values for each of the data elements and/or subblocks of the block of data elements.

A (e.g. lowest) data value and a set of differences may be determined and provided for each type of data value (e.g. R, G, B, α) represented by the data elements of the block of data elements.

In embodiments, the encoding scheme used to encode the block of data elements of the array of data elements may comprise an encoding scheme substantially as described in US 2013/0034309 or US 2013-0195352, the entire contents of which are incorporated herein by reference.

As discussed above, the header for the encoded block of data is stored in memory according to a tiled layout that is based on tiles of plural adjacent blocks of data elements of the array of data elements. The tiled layout may take any desired and suitable form that is based on tiles of plural adjacent blocks of data elements of the array of data elements.

The tiled layout may be based on, for example, tiles of plural adjacent blocks of data elements that are similar or identical in size or shape in terms of such blocks. The tiles of plural adjacent blocks of data elements may also be any desired and suitable size or shape in terms of such blocks, but are in an embodiment rectangular (including square or oblong). For example, the tiles of plural adjacent blocks of data elements may be 4×4 or 8×8 blocks of data elements in size.

The size of the tiles of plural adjacent blocks of data elements may depend on the format used for the data elements of the array. For example, the tiles of plural adjacent blocks of data elements may be larger (e.g. 8×8 blocks of data elements in size) for a lower bit depth format and smaller (e.g. 4×4 blocks of data elements in size) for a higher bit depth format.

As will be appreciated, the width of the tiles of plural adjacent blocks of data elements in terms of blocks of data elements will generally be less than the width of the array of data elements in terms of blocks of data elements and/or the height of the tiles of plural adjacent blocks of data elements in terms of blocks of data elements will generally be less than the height of the array of data elements in terms of blocks of data elements.

The header for the encoded block of data may be stored according to the tiled layout in any desired and suitable way. For example, the headers for the encoded blocks of data that represent the tile of plural adjacent blocks of data elements may be stored together (e.g. substantially contiguously) in memory.

The header for the encoded block of data may be stored in memory based on any desired and suitable space filling curve that traverses the tile of plural adjacent blocks of data elements to which the encoded block of data relates (i.e. to which the block of data elements that is represented by the encoded block of data belongs).

In embodiments, the header for the encoded block of data may be stored in memory based on Morton or Z-order that traverses the tile of plural adjacent blocks of data elements to which the encoded block of data relates. These embodiments may be particularly efficient, for example, where the array of data elements may be rotated (e.g. for display) and/or may be used for further processing by processing circuitry (e.g. a graphics processor) that generally processes arrays of data elements in blocks rather than lines.

Alternatively, the header for the encoded block of data may be stored in memory based on scan-line or raster order that traverses the tile of plural adjacent blocks of data elements to which the encoded block of data relates. These embodiments are may be more efficient, for example, where the array of data elements may not be rotated and/or may be processed by processing circuitry (e.g. an output (e.g. display) processor) that generally processes arrays of data elements in lines rather than blocks, whilst still being efficient if the array of data elements happens to be rotated and/or processed by processing circuitry (e.g. a graphics processor) that generally processes arrays of data elements in blocks rather than lines.

The particular order to use for storage in memory according to the tiled layout may be selected (e.g. in use) based on the intended use of the array of data elements. For example, a first order may be selected for a first intended use of the array of data elements, and a second order may be selected for a second intended use of the array of data elements. The first order may be Morton or z-order. The second order may be scan-line or raster order. In the first intended use, the array of data elements may be rotated (e.g. for display) and/or used for further processing by processing circuitry (e.g. a graphics processor) that generally processes arrays of data elements in blocks rather than lines. In the second intended use, the array of data elements may not be rotated and/or may be processed by processing circuitry (e.g. an output (e.g. display) processor) that generally processes arrays of data elements in lines rather than blocks.

As discussed above, the header indicates a location in memory for storing the encoded block of data. The indication may take any desired and suitable form, such as an address in memory or a memory offset (e.g. from the start of a buffer, such as a header buffer that stores the headers).

As is discussed above, the encoding scheme used to encode the block of the array of data elements may result in encoded blocks of data of non-fixed data size. Thus, in embodiments, the header may further indicate a data size for its encoded block and/or data sizes for its encoded subblocks. The data size or sizes may be expressed, for example, in terms of bits or bytes. The data sizes for the subblocks may, for example, allow the location of a particular encoded subblock within an encoded block of data to be determined without needing to access the entire encoded block of data.

The header may also be of any desired and suitable data size. The data size may be expressed in bits or bytes. For example, the header may comprise 32 bits or 4 bytes that indicate the location in memory for the encoded block of data. The header may comprise 96 bits or 12 bytes (e.g. 6 bits for each one of 4×4 subblocks) that indicate the data size of the encoded block and/or subblocks of data.

Thus, the header may, in total, be 128 bits or 16 bytes in size. The headers for each tile of plural adjacent blocks of data elements may also therefore together be 256 bytes in size (e.g. where each tile of plural adjacent blocks of data elements is 4×4 blocks of data elements in size) or 1024 bytes in size (e.g. where each tile of plural adjacent blocks of data elements is 8×8 blocks of data elements in size).

As discussed above, the encoded block of data is stored in memory at the location indicated in the header for the encoded block of data. The encoded block of data may be stored in any desired and suitable way.

However, in embodiments, respective distinct regions of memory locations (which may be referred to herein as "paging blocks") may be allocated to respective sets of adjacent blocks of data elements of the array of data elements, and the encoded block of data may be stored in memory within the region of memory locations allocated to the set of plural adjacent blocks of data to which the encoded block of data relates (i.e. to which the block of data elements that is represented by the encoded block of data belongs). Notwithstanding this, the encoded versions of the blocks of data elements of the set may still be stored substantially in any order within their allocated region of memory locations.

For example, the order of the encoded blocks of data within the allocated region of memory locations may not correspond to and/or may not be based on the locations of the corresponding blocks of data elements in the array of data elements. Instead, the location of the encoded block of data within the allocated region of memory locations may be based on the size of the encoded block of data and/or the order in which the encoded block of data was generated.

The Applicants have identified that this use of paging blocks can, for example, allow encoded blocks of data to be stored in memory in a flexible way (e.g. in any order within the allocated region of memory locations), whilst still providing some predictability of memory use. This can also, for example, allow a set of adjacent encoded blocks of data to be readily pre-fetched together from memory, e.g. using a page address or page addresses for the paging block(s) in question. This can also reduce the number of memory accesses needed to read adjacent encoded blocks of data from memory. This in turn can significantly reduce memory bandwidth and power consumption and/or improve the performance of the data processing apparatus.

Indeed, it is believed that these features of the technology described herein are new and advantageous in their own right, and not merely in the context of the above described embodiments.

Thus, another embodiment of the technology described herein comprises a method of storing an encoded block of data in memory, the method comprising:

encoding a block of data elements of an array of data elements to generate an encoded block of data that represents the block of data elements; and writing out the encoded block of data to memory, wherein respective distinct regions of memory locations are allocated to respective sets of adjacent blocks of data elements of the array of data elements and wherein the encoded block of data is stored in memory within the region of memory locations allocated to the set of plural adjacent blocks of data to which the encoded block of data relates.

Another embodiment of the technology described herein comprises a data processing apparatus for storing encoded blocks of data in memory, the apparatus comprising:

encoding circuitry configured to:

encode a block of data elements of an array of data elements to generate an encoded block of data that represents the block of data elements; and write control circuitry configured to:

write out the encoded block of data to memory, wherein respective distinct regions of memory locations are allocated to respective sets of adjacent blocks of data elements of the array of data elements and wherein the encoded block of data is stored in memory within the region of memory locations allocated to the set of plural adjacent blocks of data to which the encoded block of data relates.

As will be appreciated, these embodiments in which respective distinct regions of memory locations are allocated to respective sets of adjacent blocks of data elements can, and in some embodiments do, include any one or more or all of the optional features of the technology as described herein in any embodiment, as appropriate.

Thus, for example, a header may be generated for the encoded block of data that indicates a location in memory for storing the encoded block of data, for example as described herein in any embodiment. The header may be written out to memory, wherein the header is stored in memory according to a tiled layout, the tiled layout being formed of tiles of plural adjacent blocks of data elements of the array of data elements, for example as described herein in any embodiment. The encoded block of data may be written out to memory at the location indicated in the header for the encoded block of data, for example as described herein in any embodiment.

Thus, the encoded block of data may, in addition to relating to a set of adjacent blocks of data elements, also relate to a tile of plural adjacent blocks of data elements, for example as described herein in any embodiment. In embodiments, the plural adjacent blocks of data elements of the tile to which the encoded block of data relates may (all) belong to the set of plural adjacent blocks of data elements, and/or vice versa. These embodiments are considered to be particularly advantageous. For example, these embodiments can greatly facilitate access to the headers for adjacent blocks of data and the corresponding encoded blocks of data stored in memory.

As discussed above, these embodiments in which respective distinct regions of memory locations are allocated to respective sets of adjacent blocks of data elements can, and in some embodiments do, include any one or more or all of the optional features of the technology as described herein in any embodiment, as appropriate.

Thus, for example, the blocks of data elements of the array of data elements may be encoded in any desired and suitable way, for example as described herein in any embodiment. Similarly, the header for the encoded block of data can be written out to memory in any desired and suitable way, for example as described herein in any embodiment. Similarly, the encoded block of data can be written out to memory in any desired and suitable way, for example as described herein in any embodiment. Similarly, the (original unencoded and/or encoded) data elements, subblocks of data elements, blocks of data elements, array of data elements, headers, etc., may also take any desired and suitable form or format, for example as described herein in any embodiment.

In any of the above embodiments, the distinct regions of memory locations can have any desired and suitable data size. The distinct regions of memory locations may, for example, be similar or identical in data size. The data size may be expressed, for example, in bits or bytes. The data size may be sufficient to store the set of adjacent blocks of data elements in their unencoded original form (e.g. to accommodate a worst case scenario of no compression). The distinct regions of memory locations can each relate to one or more (e.g. whole) pages of data in memory.

The set of adjacent blocks of data elements can also have any desired and suitable size in terms of blocks of data elements. For example, the set of adjacent blocks of data elements may be 4×4 or 8×8 blocks of data elements in size. The set of adjacent blocks of data elements can also have any desired and suitable size in terms of tiles of plural adjacent blocks of data elements. For example, the set of adjacent blocks of data elements may correspond to 1 tile of plural adjacent blocks of data elements, to 2×2 tiles of plural adjacent blocks of data elements, etc., or vice versa.

The distinct region of memory locations may be accessed in any desired and suitable way. In embodiments, the distinct region of memory locations may be accessed using a memory address or memory offset for the distinct region of memory locations. As discussed above, the relevant memory address or memory offset may be indicated in a header for the encoded block of data.

In any of the above embodiments, the (original unencoded) array of data elements may be provided in any desired and suitable way. For example, embodiments may comprise generating (at least some or all of) the data elements of the array. Thus, the apparatus may comprise data generator circuitry configured to generate (at least some or all of) the data elements of the array. Embodiments may also or instead comprise reading in (at least some or all of) the data elements of the array, e.g. from memory.

The data elements of the array may be generated in any desired and suitable way. For example, generating the data elements of the array may comprise a rendering process. The rendering process may comprise deriving the data values represented by the data elements of the array (e.g. by rasterising primitives to generate graphics fragments and/or by rendering graphics fragments).

A graphics processing pipeline may be used in order to generate the data elements of the array. The graphics processing pipeline may contain any suitable and desired processing stages that graphics pipeline may contain, such as a vertex shader, a rasterisation stage, a rendering stage, etc., in order to generate the data elements of the array.

As will be appreciated, any of the above described processes that are performed in respect of the block of data elements of the array of data elements and/or encoded block of data and/or header for the encoded block of data and/or distinct region of memory locations in any embodiment may, in practice, be performed respectively for each (e.g. every) one of plural blocks and/or encoded blocks and/or headers and/or regions.

As will also be appreciated, any of the above described properties relating to the block of the array of data elements and/or encoded block of data and/or header for the encoded block of data and/or distinct region of memory locations in any embodiment may, in practice, apply to each (e.g. every) one of plural blocks and/or encoded blocks and/or headers and/or regions.

Although the technology herein has been described above with particular reference to storing an encoded block of data, it will be appreciated that the technology described herein also extends to corresponding processes in which data for an encoded block of data is retrieved from memory and then decoded to derive a data value for a data element of the encoded block of data.

Thus, another embodiment of the technology described herein comprises a method of retrieving data for an encoded block of data from memory, the method comprising:

reading in a header for an encoded block of data that represents a block of data elements of an array of data elements from memory, wherein the header is one of plural stored headers that indicate respective locations in memory at which respective encoded blocks of data elements of the array of data elements are stored and wherein the headers for the encoded blocks of data are stored in memory according to a tiled layout, the tiled layout being formed of tiles of plural adjacent blocks of data elements of the array of data elements;

determining a location in memory indicated by the header for the encoded block of data;

reading in data for the encoded block of data from memory from the location indicated by the header for the encoded block of data; and decoding the data for the encoded block of data to derive a data value for a data element of the encoded block of data.

Similarly, another embodiment of the technology described herein comprises a data processing apparatus for retrieving data for an encoded block of data from memory, the apparatus comprising:

read control circuitry configured to:
  read in a header for an encoded block of data that represents a block of data elements of an array of data elements from memory, wherein the header is one of plural stored headers that indicate respective locations in memory at which respective encoded blocks of data elements of the array of data elements are stored and wherein the headers for the encoded blocks of data are stored in memory according to a tiled layout, the tiled layout being formed of tiles of plural adjacent blocks of data elements of the array of data elements;
  determine a location in memory indicated by the header for the encoded block of data; and
  read in data for the encoded block of data from memory from the location indicated by the header for the encoded block of data; and decoding circuitry configured to:
decode the data for the encoded block of data to derive a data value for a data element of the encoded block of data.

As discussed above, respective distinct regions of memory locations ("paging blocks") may be allocated to respective sets of adjacent blocks of data elements of the array of data elements, and the encoded block of data may be stored in memory within the region of memory locations allocated to the set of plural adjacent blocks of data to which the encoded block of data relates. Notwithstanding this, the encoded versions of the blocks of data elements of the set may still be stored substantially in any order within their allocated region of memory locations. As is discussed above, it is believed that these features of the technology described herein are new and advantageous in their own right, and not merely in the context of the above described embodiments.

Thus, another embodiment of the technology described herein comprises a method of retrieving data for an encoded block of data from memory, the method comprising:

reading in data for an encoded block of data that represents a block of data elements of an array of data elements from memory, wherein respective sets of adjacent blocks of data elements of the array of data elements are stored in memory within respective distinct regions of memory locations that were allocated to those sets; and decoding the data for the encoded block of data to derive a data value for a data element of the encoded block of data.

Similarly, another embodiment of the technology described herein comprises a data processing apparatus for retrieving data for an encoded block of data from memory, the apparatus comprising:

read control circuitry configured to:

read in data for an encoded block of data that represents a block of data elements of an array of data elements from memory, wherein respective sets of adjacent blocks of data elements of the array of data elements are stored in memory within respective distinct regions of memory locations that were allocated to those sets; and decoding circuitry configured to:

decode the data for the encoded block of data to derive a data value for a data element of the encoded block of data.

As will be appreciated, these embodiments in which data for an encoded block of data is retrieved from memory can, and in some embodiments do, include any one or more or all of the optional features of the technology as described herein in any embodiment, as appropriate.

Thus, for example, embodiments may comprise (e.g. the apparatus or system) both storing an encoded block of data in the manner of the technology as described herein in any embodiment, and retrieving data for an encoded block of data in the manner of the technology as described herein in any embodiment.

Similarly, the (original and/or encoded and/or decoded) data values, data elements, blocks of data elements, array of data elements, headers, regions etc., may take any desired and suitable form or format, for example as described herein in any embodiment.

In embodiments in which a header is read in from memory for the encoded block of data, reading in the header for the encoded block of data from memory may be performed in any desired and suitable way.

In embodiments, reading in the header for the encoded block of data from memory may comprise pre-fetching and/or caching the header for the encoded block together with the headers for the tile of plural adjacent blocks of data elements to which the encoded block of data relates. Thus, the apparatus may comprise a cache for storing the header for the encoded block of data together with the headers for the tile of plural adjacent blocks of data elements to which the encoded block of data relates.

In these embodiments, as discussed above, the plural adjacent blocks of data elements of the tile to which the encoded block of data relates may (all) belong to the set of plural adjacent blocks of data elements, and/or vice versa.

Reading in data for the encoded block of data from memory may also be performed in any desired and suitable way.

In embodiments, reading in data for the encoded block of data from memory may comprise pre-fetching and/or caching data for the encoded block of data together with data for the set of adjacent blocks of data elements to which the encoded block of data relates. Thus, the apparatus may comprise a cache for storing the data for the encoded block of data together with data for the set of adjacent blocks of data elements to which the encoded block of data relates.

In embodiments in which respective distinct regions of memory locations are allocated to respective sets of adjacent blocks of data elements, the distinct region of memory locations may be accessed in any desired and suitable way. In embodiments, the distinct region of memory locations may be accessed using a memory address or memory offset for the distinct region of memory locations in question. As discussed above, the relevant memory address or memory offset may be indicated in a header for the encoded block of data.

In any of the above embodiments, the decoding scheme that is used to derive the data value for the data element of the encoded block of data can take any desired and suitable form that corresponds to the encoding scheme.

For example, as discussed above, the encoded block of data may comprise a (e.g. lowest) data value for the block and a set of differences between the data value and corresponding data values for each of the data elements and/or subblocks of the block of data elements. In these embodiments, using the decoding scheme may comprise combining (adding) the (e.g. lowest) data value and the relevant difference(s) for the data value and/or subblock in question to determine the data value for the data element of the block of data elements.

As will be appreciated, any of the above described retrieving processes that are performed in respect of a header and/or an encoded block and/or subblock and/or tile of blocks of data elements and/or set of blocks of data elements may, in practice, be performed respectively for each (e.g. every) one of plural headers and/or encoded blocks and/or subblocks and/or tiles of blocks and/or sets of blocks for an array of data elements.

Similarly, as will be appreciated, any of the above described decoding processes that are performed in respect of a data value or data element of an encoded block and/or subblock may, in practice, be performed respectively for each (e.g. every) one of plural data values or data elements of the encoded block and/or subblock.

In any of the above embodiments, once determined, a data value for a data element of an encoded block may be used in any desired and suitable way.

The data value may be used, for example, for further processing by processing circuitry (e.g. a graphics processor) that processes arrays of data elements in blocks, e.g. rather than lines.

The data value may be used (e.g. by (e.g. a texture mapper of) a graphics processor) when deriving a further data value. In these embodiments, the array of data elements may correspond to a graphics texture and the data value may correspond to a texel or texels.

The data value may also or instead be used, for example, for further processing by processing circuitry (e.g. an output (e.g. display) processor) that processes arrays of data elements in lines, e.g. rather than blocks.

The data value (or further data value) may be outputted (e.g. by an output (e.g. display) processor), e.g. for display. In these embodiments, the array of data elements may correspond to a frame of graphics data and the data value may correspond to a pixel or pixels. In these embodiments, the data value may form part of an output array of data elements. The output array of data elements may be a rotated output relative to the (encoded) stored array of data elements.

In any of the above embodiments, the apparatus, or a system that comprises the apparatus, may further comprise a memory controller configured to store and/or retrieve encoded blocks of data and/or headers in and/or from memory.

In any of the above embodiments, the apparatus, or a system that comprises the apparatus, may further comprise memory configured to store encoded blocks of data and/or headers in the manner disclosed herein.

In any of the above embodiments, the memory may comprise a first memory portion (e.g. a "header buffer") for storing headers in the manner disclosed herein and/or a second memory portion (e.g. a "body buffer") for storing encoded blocks of an array of data elements in the manner disclosed herein.

The encoding and/or storing and/or retrieving and/or decoding processes described herein in any embodiment may be performed by any desired and suitable apparatus.

For example, the encoding and/or storing and/or retrieving and/or decoding processes described herein in any embodiment may be performed by a graphics processor, a video (codec) processor, and/or an output (e.g. display) processor. The data processing apparatus may therefore comprise one or more of or may be: a graphics processor; a video (codec) processor; and an output (e.g. display) processor. Thus, the encoding circuitry, write control circuitry, read control circuitry and/or decoding circuitry may form part of a graphics processor, a video (codec) processor, or an output (e.g. display) processor. The data processing apparatus may comprise, or may be, or may form part of, a system on chip (SoC).

The memory referred to herein may be any desired and suitable memory of or for the data processing apparatus. The memory may be external to a graphics processor, a video (codec) processor, and/or an output (e.g. display) processor. The memory may be external to the data processing apparatus. The memory may be, for example, main system memory. The encoded block(s) may be written out to, stored in, and/or read in from a texture buffer or framebuffer of the memory.

The technology described herein can be used for all forms of data arrays that a data (e.g. graphics) processing apparatus may provide and/or use, such as frames for display, graphics textures, render to texture outputs, etc. Thus, as indicated above, the array of data elements may comprise graphics data and/or may correspond to a frame or texture of graphics data.

In an embodiment, the various functions of the technology described herein are carried out on a single data (e.g. graphics) processing platform that provides and/or uses the data elements of the array.

As will be appreciated by those skilled in the art, the data processing apparatus of the technology described herein may be part of an overall data (e.g. graphics) processing system that includes, for example, a host (e.g. central) processor. The host processor may, for example, execute applications that require data (e.g. graphics) processing by the data processing apparatus. The host processor may send appropriate commands and data to the data processing apparatus to control it to perform data (e.g. graphics) processing operations and to generate and/or use an (e.g. graphics) output required by applications executing on the host processor. To facilitate this, the host processor may execute a driver for the data processing apparatus and/or may execute a compiler or compilers for compiling (e.g. shader) programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the array.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the system can otherwise include any one or more or all of the usual functional units, etc., that data (e.g. graphics) processing systems include.

The various data (e.g. graphics) processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, embodiments of the technology described herein may comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus, graphics processor, renderer or microprocessor system comprising a data processor causes in conjunction with said data processor said apparatus, processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus embodiments of the technology described herein may comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As is discussed above, embodiments of the technology described herein relate to arrangements that comprise storing encoded blocks of data in memory. Headers are generated for the encoded blocks of data. The headers are stored in memory according to a tiled layout that is based on tiles of plural adjacent blocks of data elements. Respective sets of the encoded blocks of data are also stored in respective distinct regions of memory locations that have been allocated to those sets. This can provide an efficient way to access headers and corresponding encoded blocks of data in memory.

Various embodiments of the technology described herein will now be described in the context of the processing of graphics data for display. However, the concepts described herein can equally be applied to contexts in which arrays of other types of data are accessed.

FIG. 1 shows schematically an embodiment of a data processing system 100 that can store encoded arrays of data elements and retrieve data for encoded arrays of data elements in the manner of the technology described herein.

In this embodiment, the system 100 comprises a data processing apparatus in the form of a system on chip (SoC) 102. The system 100 also comprises off-chip (main) memory 116 and a display device 118.

The SoC 102 comprises a central processing unit (CPU) 104, a graphics processing unit (GPU) 106, a video codec 108, a display controller 110, an interconnect 112 and a memory controller 114.

As is shown in FIG. 1, the CPU 104, GPU 106, video codec 108, and display controller 110 communicate with each other via the interconnect 112 and with the memory 116 via the interconnect 112 and memory controller 114. The display controller 110 also communicates with the display device 118.

In the following embodiments, the GPU 106 generates and stores encoded graphics data. The encoded graphics data is then read, decoded and output, e.g. by the display device 118 for display. In other embodiments, the video codec 108 may encode graphics data and then store the encoded graphics data and/or may read encoded graphics data and then decode the encoded graphics data.

Figure 2:
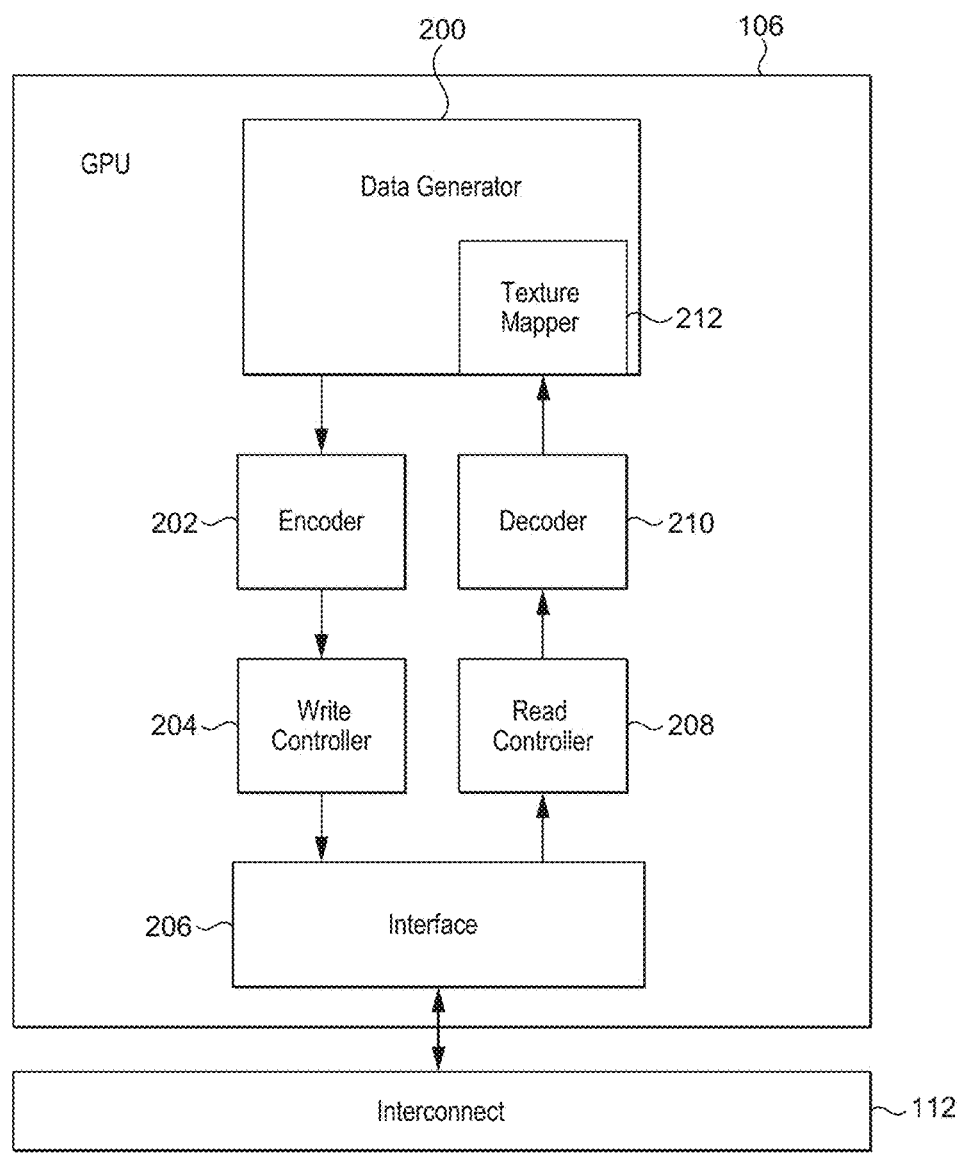
FIG. 2 shows schematically a graphics processor according to an embodiment of the technology described herein.

FIG. 2 shows further details of the GPU 106. In this embodiment, the GPU 106 comprises a data generator 200 that generates frames of graphics data. In this embodiment, the data generator 200 generates graphics data using a graphics processing pipeline.

The GPU 106 also comprises an encoder 202 that encodes the graphics data. In doing this, the encoder 202 divides the frame of graphics data into a plurality of similarly shaped non-overlapping blocks and then encodes each of those blocks separately. The encoded blocks of graphics data are then written out to memory 116 by a write controller 204 via an interface 206. The process of generating and storing an encoded block of data is described in more detail below.

The GPU 106 also comprises a read controller 208 that can read in, via the interface 206, data for a block of an encoded texture from memory 116. The encoded data for the block is then decoded by a decoder 210 before being used by a texture mapper 212 of the data generator 200. The process of retrieving and decoding data for an encoded block of data is described in more detail below.

The graphics processing pipeline and rendering process will now be described in more detail with reference to FIG. 3.

Figure 3:
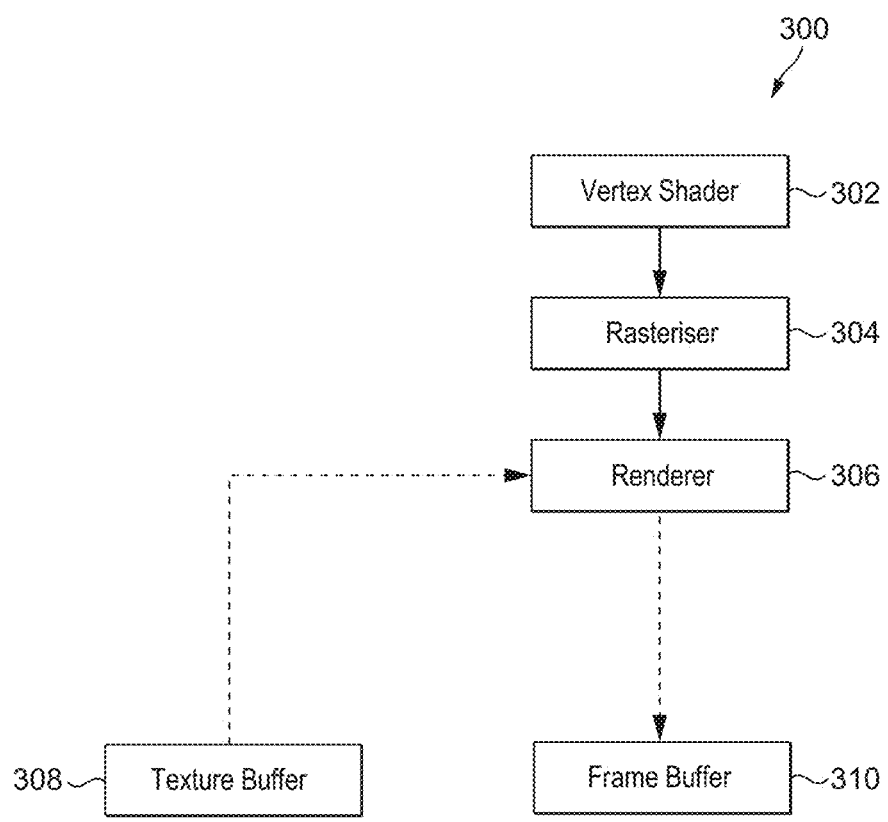
FIG. 3 shows a graphics processing pipeline that can be used in embodiments of the technology described herein.

As is shown in FIG. 3, the pipeline 300 comprises a sequence of different stages, with each stage performing a different operation on "primitives" (e.g. polygons) making up the surfaces of the features of the frame to prepare them for output.

First in the pipeline 300 is a vertex shader 302 which vertex shades the vertices of the primitives for the output being generated. The vertex shader 302 takes input data values associated with the vertices, etc., defined for the output to be generated, and processes those data values to generate a set of vertex shaded attribute data values for use by subsequent stages of the graphics processing pipeline 300.

The rasteriser 304 then operates to rasterise the primitives making up the render output into individual graphics fragments for processing. To do this, the rasteriser 304 receives the graphics primitives for rendering, rasterises the primitives to sampling points and generates graphics fragments representing appropriate sampling positions for rendering the primitives. The fragments generated by the rasteriser 304 are then sent onwards to the rest of the pipeline 300 for processing.

The graphics fragments generated by the rasteriser 304 are then passed to the renderer 306 for shading. The output of the renderer 306 is a set of appropriately shaded, e.g. colour, values for sampling positions for the frame. The output of the renderer 306 is then stored in a frame buffer 310 of the memory 116.

The renderer 306 includes a number of different processing units, such as a fragment shader, blender, texture mapper 212, etc. In particular, as shown in FIG. 3, the renderer 306 will, inter alia, access encoded textures stored in a texture buffer 308 that is accessible to the GPU 106, so as to be able to apply the relevant texture to fragments that it is rendering.

The memory where the texture buffer 308 resides may be on chip or in external memory (e.g. memory 116) that is accessible to the GPU 106.

The GPU 106 uses the retrieval process of the embodiments described herein in respect of the stored encoded textures in the texture buffer 308. Thus, when the renderer 306 needs to access a texture value, the texture buffer 308 will be read by the read controller 208 in the manner described herein.

The GPU 106 also uses the storage process of the embodiments described herein in respect of encoded output data to be stored in the frame buffer 310. Thus, when the generated output data from the GPU 106 is written out to the frame buffer 310, that data is encoded by the encoder 202 and then written to the frame buffer 310 by the write controller 204 in the manner described herein.

This encoded output data can then be read from the frame buffer 310 in the manner described herein and decoded, e.g., by the display controller 110 for the display device 118 on which the frame is to be displayed. Thus, in this embodiment, the display controller 110 comprises a read controller and decoder similar to those of the GPU 106. In other embodiments, the video codec 108 may comprise a read controller and decoder and/or write controller and encoder similar to those of the GPU 106.

Other arrangements for the data processing system 100 would, of course, be possible.

A process of encoding and storing a block of data elements of an array of data elements, such as a texture or frame of graphics data, will now be described in more detail with reference to FIGS. 4-9.

Figure 4A:
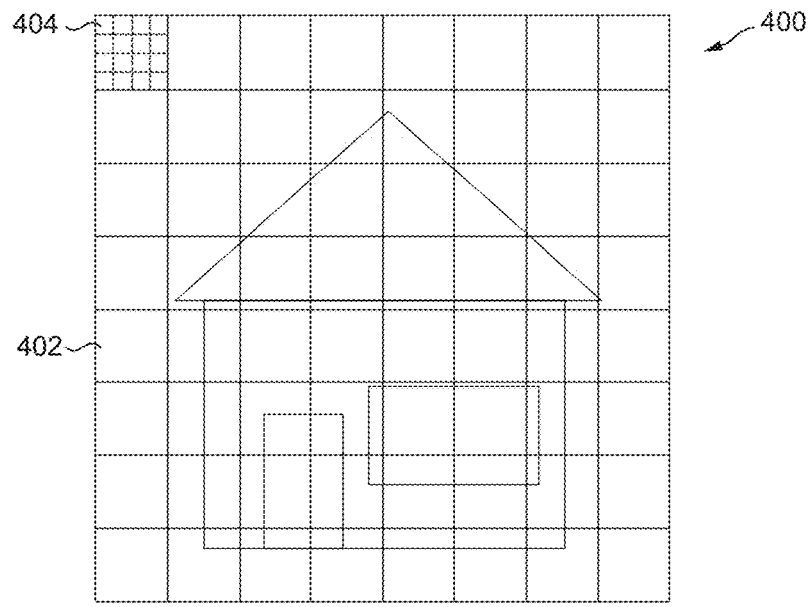
FIG. 4A shows an array of data elements to be encoded according to an embodiment of the technology described herein.

FIG. 4A shows an array of data elements 400 to be encoded and stored. In this embodiment, the array of data elements 400 is part of a frame of graphics data and is 128×128 data elements in size. In this embodiment, each data element has an RGBX8 format. Thus, each data element comprises an 8-bit red (R) data value, an 8-bit green (G) data value, an 8-bit blue (B) data value and an 8-bit transparency (α) data value, giving 32 bits in total per data element. Other array sizes and data element formats could of course be used as desired.

As is shown in FIG. 4A, the array of data elements 400 is divided into 64 (i.e. 8×8) blocks 402 for encoding purposes. In this embodiment, each block 402 is 16×16 data elements in size. In these embodiments, the size of each block is therefore 1024 bytes (i.e. 16×16×32/8). These square-shaped block embodiments can be particularly efficient, for example, when the array of data elements may be rotated (e.g. for display) and/or may be used for further processing by processing circuitry (e.g. a graphics processor) that generally processes arrays of data elements in blocks rather than lines.

Other block sizes could of course be used as desired, such as blocks of data elements which are 32×8 data elements in size. These oblong-shaped block embodiments can be more efficient, for example, when the array of data elements may not be rotated (e.g. for display) and/or may be used for further processing by processing circuitry (e.g. an output (e.g. display) processor) that generally processes arrays of data elements in lines rather than blocks, whilst still being efficient if the array of data elements happens to be rotated and/or processed by processing circuitry (e.g. a graphics processor) that generally processes arrays of data elements in blocks rather than lines.

As is also shown in FIG. 4A, the blocks of data elements are further divided into 16 (i.e. 4×4) subblocks 404 for encoding purposes. In this embodiment, each subblock 404 is 4×4 data elements in size. In these embodiments, the size of each subblock is therefore 64 bytes (i.e. 4×4×32/8). Again, other subblock sizes could be used as desired.

In this embodiment, the encoding scheme that is used to encode the blocks 402 of the array 400 is a lossless entropy encoding scheme that comprises, inter alia, determining, for each type of data value represented by the data elements of the block 402 (i.e. for each of R, G, B and α), a lowest data value and a set of differences for each data element and subblock 404 of the block 402. The encoded version of the block 402 therefore comprises a lowest data value and a set of differences for each data element and subblock 404 of the block 402.

In this embodiment, the data size of the encoded version of the block is not fixed and is based on the particular data values of the block. For example, a block 402 of substantially uniform colour will compress to an encoded block that is smaller in data size than a block 402 of more highly varied colour.

Further details of a suitable encoding scheme can be found, for example, in US 2013/0034309 or US 2013-0195352, the entire contents of which are incorporated herein by reference. Other encoding schemes could of course be used as desired.

As will be appreciated, the encoding process is repeated for each block 402 that is to be encoded.

Figure 4B:
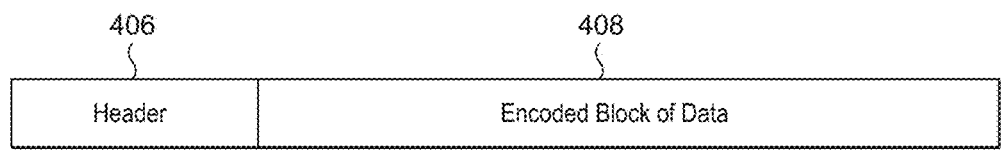
FIG. 4B shows a data structure comprising a header and corresponding encoded block of data according to embodiments of the technology described herein.

FIG. 4B shows a header 406 and encoded block of data 408 according to an embodiment of the technology described herein. In this embodiment, the header 406 will be stored in a "header buffer" of the memory 116 and the encoded block of data 408 will be stored in a "body buffer" of the memory 116. The header buffer and body buffer may, for example, form part of the frame buffer or texture buffer.

In this embodiment, the header 406 comprises a 32 bit offset from the start of the header buffer to the corresponding encoded block of data in the body buffer. This offset allows the encoded block of data to be located in memory. In this embodiment, the header also comprises a 6 bit data size for each of the 16 (i.e. 4×4) encoded subblocks of the encoded block of data 408. These data sizes allow each of the subblocks to be independently located in memory. Thus, in this embodiment, the header is 128 bits or 16 bytes in size.

A process of storing headers in memory will now be described with reference to FIGS. 5 and 6.

FIG. 5 shows 64 blocks of data elements 500 for an array of data elements. The blocks of data elements 500 are shown in y\x positions that correspond to positions for the blocks in the array of data elements.

In this embodiment, the blocks of data elements 500 are divided into a first tile 502 of plural adjacent blocks of data elements, a second tile 504 of plural adjacent blocks of data elements, a third tile 506 of plural adjacent blocks of data elements, and a fourth tile 508 of plural adjacent blocks of data elements, with each tile comprising 16 (i.e. 4×4) blocks of data elements. Other sized tiles may of course be used as desired, e.g. depending on the bit depth of the format of the data elements, such as tiles that comprise 64 (i.e. 8×8) blocks of data elements.

FIG. 5 also shows the order (i.e. from 0 to 63) in which the headers for the encoded blocks that represent the blocks of the tiles are stored in memory according to the layout of the tiles. As is shown in FIG. 5, in this embodiment, the headers for the encoded blocks that represent the blocks of the first tile 502 are stored contiguously based on a Morton or z-order (i.e. from 0 to 15), then the headers for the encoded blocks that represent the blocks of the second tile 504 are stored contiguously based on a Morton or z-order (i.e. from 16 to 31), then the headers for the encoded blocks that represent the blocks of the third tile 506 are stored contiguously based on a Morton or z-order (i.e. from 32 to 47), and then the headers for the encoded blocks that represent the blocks of the fourth tile 508 are stored contiguously based on a Morton or z-order (i.e. from 48 to 63).

Figure 6:
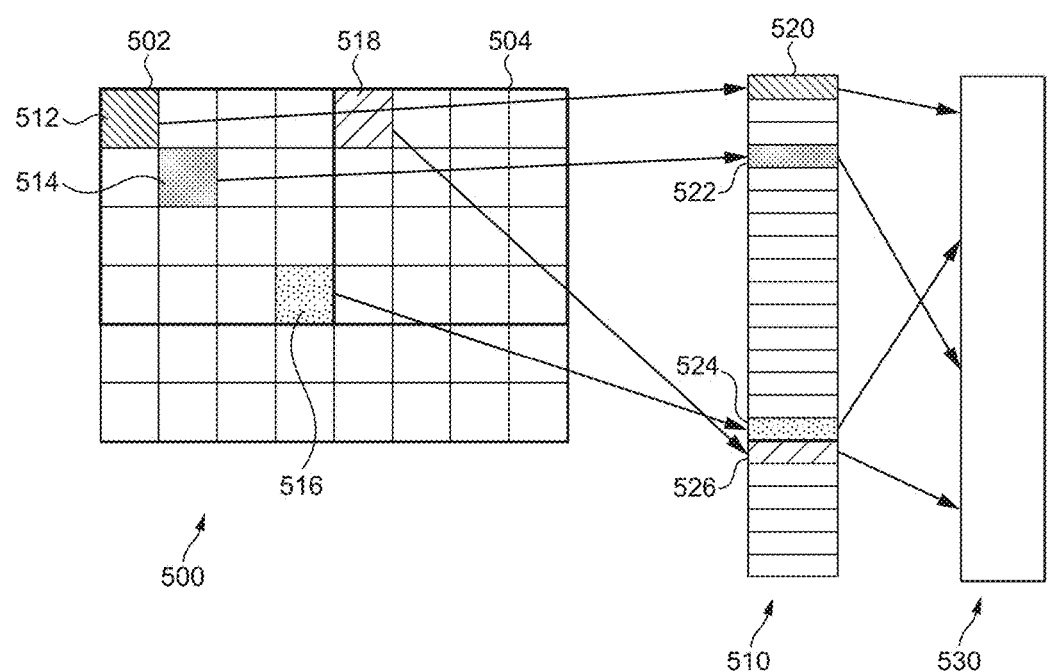
FIG. 6 shows tiles of plural adjacent blocks of data elements, a header buffer for storing headers, and a body buffer for storing encoded blocks of data, according to an embodiment of the technology described herein.

FIG. 6 shows how some of the headers for the encoded blocks that represent the blocks of the first tile 502 and second tile 504 are mapped to a header buffer 510. As is shown for the first tile 502, a first header for the first encoded block 512 is mapped to the first location 520 in the header buffer 510, a fourth header for the fourth encoded block 514 is mapped to the fourth location 522 in the header buffer 510, a sixteenth header for the sixteenth encoded block 516 is mapped to the sixteenth location in the header buffer 510, etc. Then, as is shown for the second tile 504, a first header for the first encoded block 518 of the second tile 504 is mapped to the seventeenth location in the header buffer 510, etc.

FIG. 6 also shows how the headers in the header buffer 510 indicate locations in a body buffer 530 at which the encoded blocks of data are stored. It is important to note here that, since the encoded blocks of data can be various data sizes, they generally will not be evenly distributed in the body buffer 530. As is shown in FIG. 6, the use of headers also means that the encoded blocks of data do not need to be stored in any particular order in the body buffer 530.

In the above embodiment, the headers relating to each tile are stored based on a Morton or z-order. These embodiment can be particularly efficient, for example, when the array of data elements may be rotated (e.g. for display) and/or may be used for further processing by processing circuitry (e.g. a graphics processor) that generally processes arrays of data elements in blocks rather than lines.

Figures 7, 8:
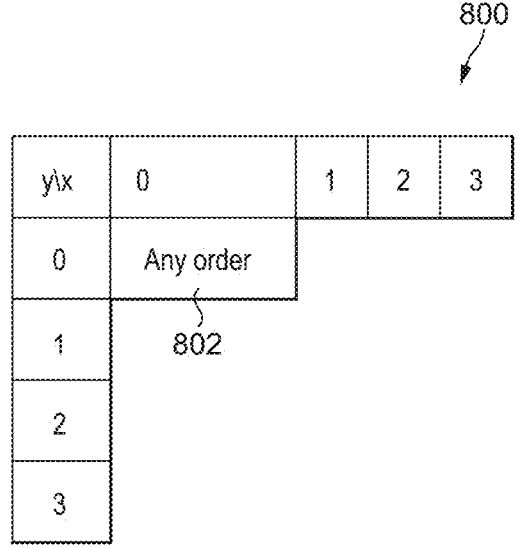
FIG. 7 shows an alternative order for storing headers according to a tiled layout in accordance with an embodiment of the technology described herein.
FIG. 8 shows a paging block for storing a set of adjacent encoded blocks of data according to an embodiment of the technology described herein.

An alternative process of storing headers in memory will now be described with reference to FIG. 7.

FIG. 7 again shows 64 blocks of data elements 700 for an array of data elements. The blocks of data elements 700 are again shown in y\x positions that correspond to positions for the blocks in the array of data elements.

In this embodiment, the blocks of data elements 700 are again divided into a first tile 702 of plural adjacent blocks of data elements, a second tile 704 of plural adjacent blocks of data elements, a third tile 706 of plural adjacent blocks of data elements, and a fourth tile 708 of plural adjacent blocks of data elements, with each tile comprising 16 (i.e. 4×4) blocks of data elements. Again, other sized tiles may be used as desired, e.g. depending on the bit depth of the format of the data elements, such as tiles that comprise 64 (i.e. 8×8) blocks of data elements.

FIG. 7 again also shows the order (i.e. from 0 to 63) in which the headers for the encoded blocks that represent the blocks of the tiles are stored in memory according to the layout of the tiles. As is shown in FIG. 7, in this embodiment, the headers for the encoded blocks that represent the blocks of the first tile 702 are stored contiguously based on a scan-line or raster order (i.e. from 0 to 15), then the headers for the encoded blocks that represent the blocks of the second tile 704 are stored contiguously based on a scan-line or raster order (i.e. from 16 to 31), then the headers for the encoded blocks that represent the blocks of the third tile 706 are stored contiguously based on a scan-line or raster order (i.e. from 32 to 47), and then the headers for the encoded blocks that represent the blocks of the fourth tile 708 are stored contiguously based on a scan-line or raster order (i.e. from 48 to 63).

These embodiments can be more efficient, for example, when the array of data elements may not be rotated and/or may be processed by processing circuitry (e.g. an output (e.g. display) processor) that generally processes arrays of data elements in lines rather than blocks, whilst still being efficient if the array of data elements happens to be rotated and/or processed by processing circuitry (e.g. a graphics processor) that generally processes arrays of data elements in blocks rather than lines.

A process of storing the encoded blocks in memory will now be described with reference to FIG. 8. In this embodiment, paging blocks that each relate to a distinct region of memory locations in the body buffer of the memory are allocated to respective sets of adjacent blocks of data elements. The paging blocks are shown with reference to y\x tile positions that correspond to positions for the tiles of plural adjacent blocks in the array of data elements. Thus, in this embodiment, each set of adjacent blocks of data elements for a paging block corresponds to a tile of plural adjacent blocks of data elements as shown in FIG. 5 or 7. For example, as is shown in FIG. 8, the paging block 802 is allocated to the set of plural adjacent blocks of data elements for tile 502 in FIG. 5 having y\x tile position 0\0. However, in other embodiments, each set of adjacent blocks of data elements for a paging block could correspond to plural (e.g. 4) tiles of plural adjacent blocks of data elements.

In this embodiment, each encoded block of data is stored in memory within the paging block allocated to the set of blocks of data elements to which the encoded block of data relates. Notwithstanding this, the encoded blocks of data can still be stored in substantially any order within their allocated paging block. For example, each of the encoded blocks of data relating to tile 502 can be stored in any order in their allocated paging block 802. Similarly, the set of encoded blocks of data relating to tile 504 in FIG. 5 having y\x tile position 0\1 can be stored in any order in another distinct paging block, the set of encoded blocks of data relating to tile 506 in FIG. 5 having y\x tile position 1\0 can be stored in any order in another distinct paging block, and the set of encoded blocks of data relating to tile 508 in FIG. 5 having y\x tile position 1\1 can be stored in any order in another distinct paging block. This allows the memory still to be used flexibly, but also provides some predictability of memory use.

A process of storing both headers and encoded blocks in memory will now be described with reference to FIGS. 9A-9D.

Figure 9A:
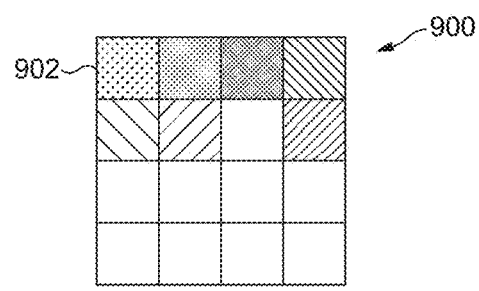
FIG. 9A shows a tile of plural adjacent blocks of data elements according to an embodiment of the technology described herein.

FIG. 9A shows 16 (i.e. 4×4) adjacent blocks of data elements 902 that form a single tile 900. In a similar manner to FIG. 4A, each block of data elements 902 is also divided into 16 (i.e. 4×4) subblocks of data elements for encoding purposes, with each subblock comprising 16 (i.e. 4×4) data elements.

Figure 9B:
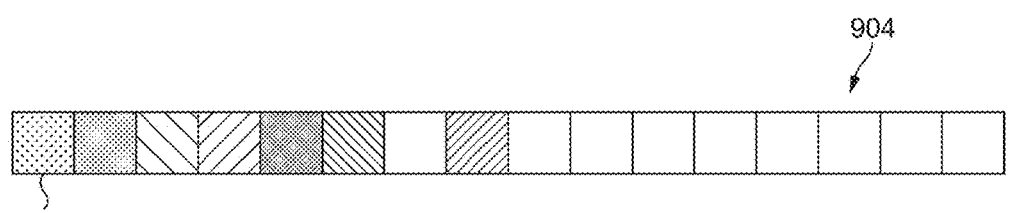
FIG. 9B shows part of a header buffer for storing headers of a tile of plural adjacent blocks of data elements according to an embodiment of the technology described herein.
Figure 9C:
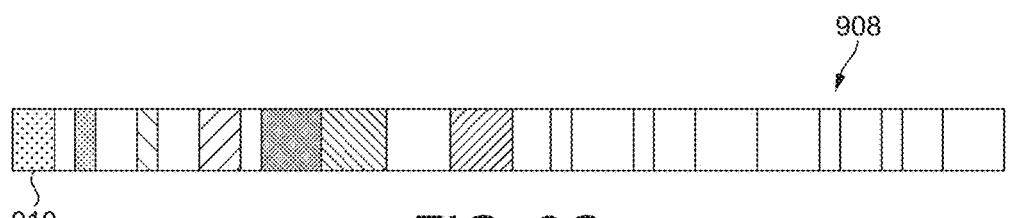
FIG. 9C shows part of a body buffer for storing encoded blocks of data according to an embodiment of the technology described herein.
Figure 9D:
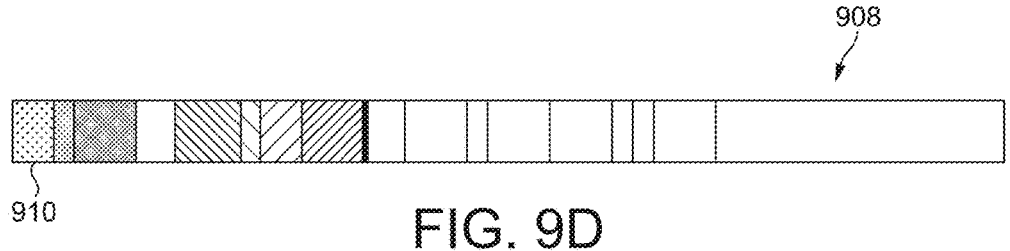
FIG. 9D shows part of a body buffer for storing encoded blocks of data according to an alternative embodiment of the technology described herein.

FIG. 9B then shows, with shading corresponding to the shading of the blocks of data elements 902, the 16 corresponding headers 906 stored contiguously based on a Morten or z-order in a header buffer 904 of the memory 116. FIG. 9C then shows, again with shading corresponding to the shading of the blocks of data elements 902, an order in which 16 corresponding encoded blocks of data 910 can be stored in a paging block 908 of a body buffer of the memory 116.

As discussed above, the encoded blocks of data 910 can be stored in any order within a paging block. Accordingly, FIG. 9D shows, again with shading corresponding to the shading of the blocks of data elements 902, an alternative order in which 16 corresponding encoded blocks of data 910 could be stored in the paging block 908.

A process of determining a data value for a data element of an encoded block of data of an array of data elements, such as an encoded texture or frame of graphics data, will now be described.

In this embodiment, an encoded block of data and its header have previously been generated and written out to memory as described above.

In order to determine a data value for a data element of the encoded block of data, a header for the encoded block of data is read in from the header buffer in memory. The location for the encoded block of data in the body buffer in memory is then determined from the header. The data for the encoded block of data is then read in from memory from the location in the relevant paging block indicated by the header. The data for the encoded block of data is then decoded to derive the data value. In this embodiment, the decoding comprises adding the lowest data value for the block and the relevant differences for the data value and subblock in question to determine the data value.

As will be appreciated, the decoding process is repeated for each data value that is to be determined for the subblock and/or block. The retrieval and decoding process is also repeated for each block for which a data value is to be determined.

Where a subsequent block of data elements for which a data value is to be determined belongs to the same tile and/or set of plural adjacent blocks of data elements to which the current block of data elements relates, the decoding process for that subsequent block of data elements can potentially be further facilitated by pre-fetching and caching the headers for the tile of blocks of data elements to which the current encoded block of data relates and/or by pre-fetching and caching data for the set of encoded blocks of data to which the current encoded block of data relates, such that the header and/or data for the subsequent block of data elements is already available for use since they have been pre-fetched and cached together with the header and/or data for the current block of data elements.

The determined data values can then be used as desired. For example, as discussed above, the determined data values may be texture values that are used by the GPU 106 to determine further (e.g. colour) data values. As discussed above, embodiments of the technology described herein can be particularly efficient in this context.

Alternatively, the determined data values may be pixel values that are output, e.g. by the display controller 110 for display by the display device 118. In these embodiments, the position of the pixel values in the output may be rotated relative to the position of the data values in the array of data elements. As discussed above, embodiments of the technology described herein can be particularly efficient in this context.

It can be seen from the above that embodiments of the technology described herein can provide an efficient way to read headers and corresponding encoded blocks of data from memory. This is achieved in embodiments of the technology described herein by generating headers for sets of encoded blocks of data, storing those headers in memory according to a tiled layout that is based on tiles of plural adjacent blocks of data elements, and storing each set of encoded blocks of data in a distinct region of memory locations that has been allocated to that set.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of storing encoded blocks of data in memory, the method comprising:

encoding blocks of data elements of an array of data elements to generate encoded blocks of data, each of the encoded blocks of data representing one of the blocks of data elements;

generating a header for each of the encoded blocks of data, wherein each header indicates a location in memory for storing the corresponding encoded block of data;

writing out the headers for the encoded blocks of data to memory, wherein the headers for the encoded blocks of data are stored in memory according to a tiled layout, the tiled layout being formed of tiles of plural adjacent blocks of data elements of the array of data elements, each tile comprising plural adjacent blocks of data elements arranged in at least two dimensions within the array of data elements, and wherein storing the headers for the encoded blocks of data in memory according to the tiled layout comprises, for each tile, storing all of the headers for the encoded blocks of data that represent the blocks of data elements of that tile substantially contiguously in memory, such that for each tile there is a contiguous region of memory locations that store the headers for the encoded blocks of data that represent the blocks of data elements of that tile; and writing out the encoded blocks of data to memory, wherein each of the encoded blocks of data is stored in memory at the location indicated in the header for that encoded block of data.

2. A method as claimed in claim 1, wherein, for each tile, the headers for the encoded blocks of data that represent the blocks of data elements of that tile are stored in memory based on a Morton or Z-order that traverses that tile.

3. A method as claimed in claim 1, wherein, for each tile, the headers for the encoded blocks of data that represent the blocks of data elements of that tile are stored in memory based on a scan-line or raster order that traverses that tile.

4. A method as claimed in claim 1, wherein respective distinct regions of memory locations are allocated to respective sets of adjacent blocks of data elements of the array of data elements, and wherein for each set of adjacent blocks of data elements of the array of data elements, the encoded blocks of data that represent the blocks of data elements of that set of adjacent blocks of data elements are stored in memory within the region of memory locations allocated to that set of plural adjacent blocks of data elements.

5. A method as claimed in claim 4, wherein, for each tile, the plural adjacent blocks of data elements of that tile all belong to the same set of the sets of plural adjacent blocks of data elements.

6. A method as claimed in claim 1, wherein the encoding scheme used to encode the blocks of data elements of the array of data elements provides encoded blocks of data of non-fixed data size.

7. A method as claimed in claim 1, wherein the encoding scheme used to encode the blocks of data elements of the array of data elements comprises an entropy encoding scheme or difference encoding scheme.

8. A data processing apparatus for storing encoded blocks of data in memory, the apparatus comprising:
encoding circuitry configured to:
encode blocks of data elements of an array of data elements to generate encoded blocks of data, each of the encoded blocks of data representing one of the blocks of data elements; and
generate a header for each of the encoded blocks of data, wherein each header indicates a location in memory for storing the corresponding encoded block of data; and
write control circuitry configured to:
write out the headers for the encoded blocks of data to memory, wherein the headers for the encoded blocks of data are stored in memory according to a tiled layout, the tiled layout being formed of tiles of plural adjacent blocks of data elements of the array of data elements, each tile comprising plural adjacent blocks of data elements arranged in at least two dimensions within the array of data elements, and wherein the write control circuitry is configured to store the headers for the encoded blocks of data in memory according to the tiled layout by, for each tile, storing all of the headers for the encoded blocks of data that represent the blocks of data elements of that tile substantially contiguously in memory, such that for each tile there is a contiguous region of memory locations that store the headers for the encoded blocks of data that represent the blocks of data elements of that tile; and
write out the encoded blocks of data to memory, wherein each of the encoded blocks of data is stored in memory at the location indicated in the header for that encoded block of data.

9. An apparatus as claimed in claim 8, wherein the write control circuitry is configured to, for each tile, store the headers for the encoded blocks of data that represent the blocks of data elements of that tile in memory based on a Morton or Z-order that traverses that tile.

10. An apparatus as claimed in claim 8, wherein the write control circuitry is configured to, for each tile, store the headers for the encoded blocks of data that represent the blocks of data elements of that tile in memory based on a scan-line or raster order that traverses that tile.

11. An apparatus as claimed in claim 8, wherein respective distinct regions of memory locations are allocated to respective sets of adjacent blocks of data elements of the array of data elements, and wherein the write control circuitry is configured to, for each set of adjacent blocks of data elements of the array of data elements, store the encoded blocks of data that represent the blocks of data elements of that set of adjacent blocks of data elements in memory within the region of memory locations allocated to that set of plural adjacent blocks of data elements.

12. An apparatus as claimed in claim 11, wherein, for each tile, the plural adjacent blocks of data elements of that tile all belong to the same set of the sets of plural adjacent blocks of data elements.

13. An apparatus as claimed in claim 8, wherein the encoding circuitry is configured to encode the blocks of data elements of the array of data elements using an encoding scheme that provides encoded blocks of data of non-fixed data size.

14. An apparatus as claimed in claim 8, wherein the encoding circuitry is configured to encode the blocks of data elements of the array of data elements using an entropy encoding scheme or difference encoding scheme.

15. A non-transitory computer readable storage medium storing computer software code which, when executing on a processor of a data processing apparatus performs a method of storing encoded blocks of data in memory, the method comprising:
encoding blocks of data elements of an array of data elements to generate encoded blocks of data, each encoded block of data representing one of the blocks of data elements;
generating a header for each of the encoded block of data, wherein each header indicates a location in memory for storing the corresponding encoded block of data;
writing out the headers for the encoded blocks of data to memory, wherein the headers for the encoded blocks of data are stored in memory according to a tiled layout, the tiled layout being formed of tiles of plural adjacent blocks of data elements of the array of data elements, each tile comprising plural adjacent blocks of data elements arranged in at least two dimensions within the array of data elements, and wherein storing the headers for the encoded blocks of data in memory according to the tiled layout comprises, for each tile, storing all of the headers for the encoded blocks of data that represent the blocks of data elements of that tile substantially contiguously in memory, such that for each tile there is a contiguous region of memory locations that store the headers for the encoded blocks of data that represent the blocks of data elements of that tile; and
writing out the encoded blocks of data to memory, wherein each of the encoded blocks of data is stored in memory at the location indicated in the header for that encoded block of data.

* * * * *